W. H. BROWNING.
EDGE TRIMMER.
APPLICATION FILED AUG. 13, 1919.
1,348,847.
Patented Aug. 10, 1920.
2 SHEETS—SHEET 1.
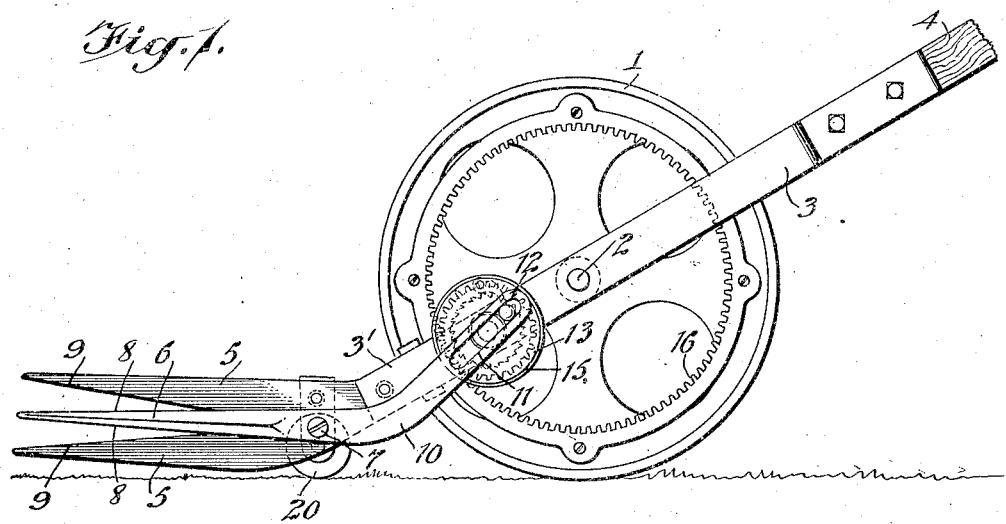
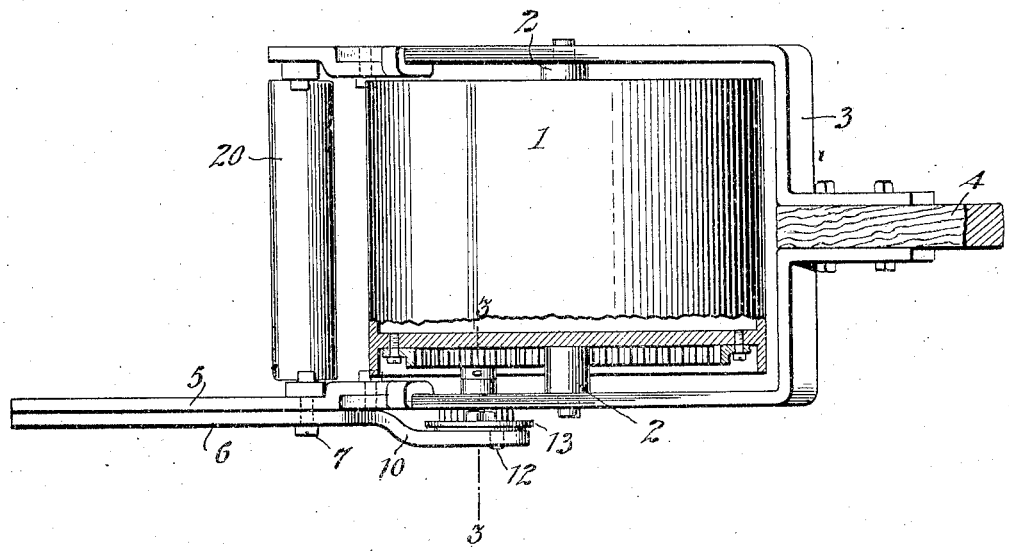
WITNESSES
INVENTOR
William H. Browning
BY
ATTORNEYS

W. H. BROWNING.
EDGE TRIMMER.
APPLICATION FILED AUG. 13, 1919.

1,348,847.

Patented Aug. 10, 1920.
2 SHEETS—SHEET 2.

WITNESSES

INVENTOR
William H. Browning
BY
ATTORNEYS

UNITED STATES PATENT OFFICE.

WILLIAM HULL BROWNING, OF NEW YORK, N. Y.

EDGE-TRIMMER.

1,348,847.  Specification of Letters Patent.  Patented Aug. 10, 1920.

Application filed August 13, 1919. Serial No. 317,370.

*To all whom it may concern:*

Be it known that I, WILLIAM H. BROWNING, a citizen of the United States, and a resident of the city of New York, borough of Manhattan, in the county of New York and State of New York, have invented a new and Improved Edge-Trimmer, of which the following is a full, clear, and exact description.

This invention relates to improvements in edge trimmers, an object of the invention being to provide a device of the character stated which can be operated along the edge of a walk or around the edges of flower beds and the like to cut the grass which hangs over or is pressed down by the mower in cutting the lawn.

This work has heretofore been done generally with hand operated shears and is a slow, laborious work, frequently imperfectly done. With my improved device the cutting is performed by shears carried and operated by a support rolling on the ground and the position of the shears is controlled by the position of the handle of the device.

With these and other objects in view, the invention consists in certain novel features of construction and combinations and arrangements of parts as will be more fully hereinafter described and pointed out in the claims.

In the accompanying drawings:

Figure 1 is a view in side elevation illustrating my improvements.

Fig. 2 is a top plan view partly in section.

Figure 3:
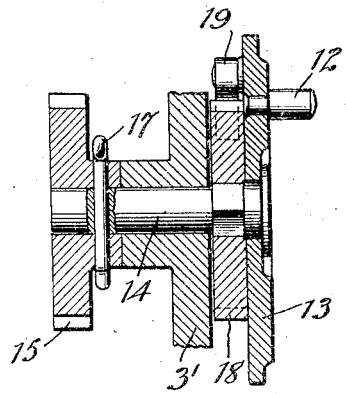
Fig. 3 is an enlarged view in section on the line 3—3 of Fig. 2.

1 represents a hollow roller, having trunnions 2 mounted to turn in a fork 3, the latter secured to a handle 4 to push the roller along the ground.

One member 3' of the fork 3 has a pair of cutter blades 5 fixed to its forward end. These blades 5 may constitute a single plate if desired and have adjacent sharp cutting edges 9.

A removable cutter blade 6 is pivotally connected to the blades 5 by means of a screw or other connecting device 7 and has sharp cutting edges 8 at both sides adapted to coöperate with the cutting edges 9 to sever the grass when the blade 6 is moved.

The blade 6 has a rearwardly and upwardly projecting arm 10, the latter made with a slot 11 to receive a crank pin 12 on a crank disk 13.

Crank disk 13 is mounted to turn on a short shaft 14 the latter mounted to turn in the member 3' and has a pinion 15 at its inner end engaging an internal rack 16 secured in roller 1. A cotter pin 17 may be used as a securing device for the pinion 15 if desired, as shown in Fig. 3.

A ratchet wheel 18 is secured to turn with shaft 14 and a pawl 19 on the disk 13 engages the ratchet wheel, so that the crank disk is turned only when the device is moved in a forward direction.

The turning of the crank disk 13 imparts an oscillating movement to the cutter blade 6 to cut the grass at the edge of a walk or around a garden as will be readily understood.

A roller 20 has rotary mounting in the forward ends of the fork 3 and prevents the ends of the cutter blades from being moved into contact with the ground, and the elevation of the shears formed by blades 5 and 6 are controlled by the handle 4 and the fork 3. Thus the operator can position the shears as desired by moving the handle.

Figure 4:
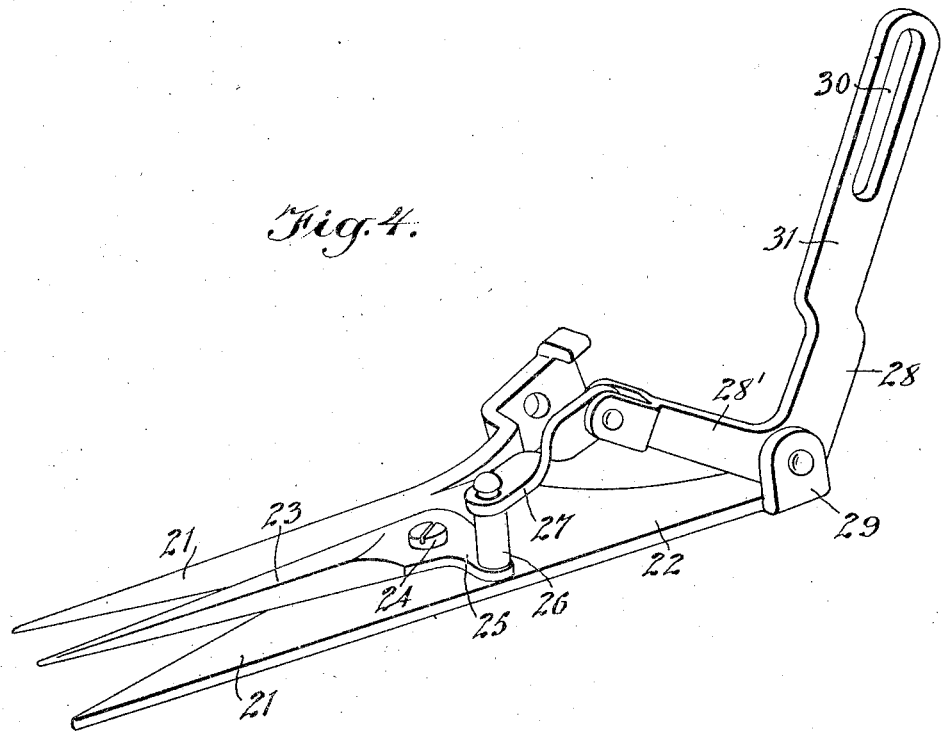
Fig. 4 is a perspective view illustrating a modification.

Instead of positioning the shears vertically as shown in Figs. 1 and 2 they may be positioned horizontally as shown in Fig. 4.

In this modification the fixed blades 21 constitute a part of a plate 22 and the movable blade 23 is pivotally connected thereto by a screw or other connecting device 24, and has a laterally projecting arm 25 with a post 26 thereon.

A link 27 connects the post 26 with the shorter member 27' of a bell-crank-lever 28, the latter pivotally connected to a lug 29 on plate 22 and having a slot 30 in its longer end 31 to receive the crank pin 12 above referred to.

A bracket arm 32 is provided on plate 22 for attachment to the member 3' of the fork 3.

Various slight changes might be made in the general form of the parts described without departing from my invention, and hence I do not limit myself to the precise details set forth but consider myself at liberty to make such slight changes and alterations as fairly fall within the spirit and scope of the appended claims.

I claim:

1. An edge cutter, comprising a roller, a fork connected to the roller, a handle on the fork, shears carried by one member of the fork, and a roller supporting the shears.

2. An edge cutter, comprising a roller, a fork connected to the roller, a handle on the fork, shears connected to one member of the fork, means operated by the roller for operating the shears, and a roller supporting the shears.

3. An edge cutter, comprising a roller, a fork connected to the roller, a handle on the fork, shears on one member of the fork, an internal gear in the roller, a pinion meshing with the gear, a crank disk turned by the pinion, an arm oscillated by the crank disk and operating the shears, and a roller supporting the shears.

4. An edge cutter, comprising a roller, a handle pivotally connected to the roller, shears operated by the roller and secured to move with the handle whereby the pivotal movement of the handle operates to raise and lower the shears, and a second roller in advance of the first-mentioned roller and supporting the shears.

5. An edge cutter, comprising a roller, a fork pivotally connected to the roller, a handle on the fork, shears carried by the fork, an arm operating the movable blade of the shears, a crank disk engaging the arm, a pinion operating the disk, an internal gear in the roller operating the pinion, a ratchet and pawl permitting the crank disk to be turned in one direction only, and a second roller in advance of the first-mentioned roller and supporting the shears.

6. An edge cutter, comprising a roller, a fork pivotally connected to the roller, a handle on the fork, a pair of fixed cutter blades supported by the fork, a pivotally mounted movable blade adapted to oscillate across the adjacent edges of the fixed blades, means operated by the roller for operating the movable blade, and a second roller in advance of the first-mentioned roller and supporting the shears.

7. An edge trimmer, comprising a roller, a trunnion projecting from the roller, a fork pivotally supported on the trunnion, a handle on the fork, a pair of fixed cutter blades secured to one member of the fork at a point in advance of its connection with the trunnion, a pivotally mounted movable blade adapted to oscillate across the edges of the fixed blades, and means operated by the roller for operating the movable blade.

WM. HULL BROWNING.